United States Patent
Good et al.

(10) Patent No.: US 12,405,618 B2
(45) Date of Patent: Sep. 2, 2025

(54) DRONE SAW

(71) Applicants: Kevin Good, Tequesta, FL (US);
Daniel J. Good, Tequesta, FL (US)

(72) Inventors: Kevin Good, Tequesta, FL (US);
Daniel J. Good, Tequesta, FL (US)

( * ) Notice: Subject to any disclaimer, the term of this patent is extended or adjusted under 35 U.S.C. 154(b) by 59 days.

(21) Appl. No.: 18/540,477

(22) Filed: Dec. 14, 2023

(65) Prior Publication Data

US 2024/0201706 A1  Jun. 20, 2024

Related U.S. Application Data

(60) Provisional application No. 63/387,980, filed on Dec. 19, 2022.

(51) Int. Cl.
| | |
|---|---|
| *G05D 1/689* | (2024.01) |
| *A01G 3/08* | (2006.01) |
| *B64U 40/20* | (2023.01) |
| *B64U 60/40* | (2023.01) |
| *G05D 1/226* | (2024.01) |
| *B64U 30/299* | (2023.01) |
| *B64U 101/40* | (2023.01) |
| *G05D 105/15* | (2024.01) |
| *G05D 109/25* | (2024.01) |

(52) U.S. Cl.
CPC ........... *G05D 1/6895* (2024.01); *A01G 3/086* (2013.01); *B64U 40/20* (2023.01); *B64U 60/40* (2023.01); *G05D 1/226* (2024.01); *B64U 30/299* (2023.01); *B64U 2101/40* (2023.01); *G05D 2105/15* (2024.01); *G05D 2109/254* (2024.01)

(58) Field of Classification Search
None
See application file for complete search history.

(56) References Cited

U.S. PATENT DOCUMENTS

| | | | |
|---|---|---|---|
| 5,787,536 A * | 8/1998 | Pate | B25H 1/0028 |
| | | | 30/296.1 |
| 5,884,403 A | 3/1999 | Rogers | |
| 7,130,741 B2 | 10/2006 | Bodin et al. | |
| 7,460,148 B1 | 12/2008 | Clark et al. | |
| 7,546,187 B2 | 6/2009 | Bodin et al. | |
| 8,869,671 B2 | 10/2014 | Williamson et al. | |
| 9,314,922 B2 | 4/2016 | Dockter | |
| 9,357,712 B2 | 6/2016 | Pickett et al. | |
| 9,764,839 B2 | 9/2017 | Whitaker et al. | |
| 9,829,266 B1 | 11/2017 | Shaver et al. | |
| 9,844,892 B2 | 12/2017 | Towner et al. | |
| 9,852,644 B2 | 12/2017 | Salnikov et al. | |
| 9,855,671 B2 | 1/2018 | Towner et al. | |
| 9,908,618 B2 * | 3/2018 | Vaughn | B64U 40/20 |
| 9,915,946 B2 | 3/2018 | Poole et al. | |

(Continued)

*Primary Examiner* — Peter D Nolan
*Assistant Examiner* — Michael F Whalen
(74) *Attorney, Agent, or Firm* — McHale & Slavin, P.A.

(57) ABSTRACT

A battery powered octocopter drone with a protective frame. An articulating arm is mounted to the drone with a battery powered chain saw positioned along the end of the articulating arm. The chainsaw allows for the trimming of remote trees and bushes previously only accessible by a ladder or bucket lift. The drone is adjustable forward/aft to compensate for the center of gravity. The drone includes a remote control receiver, telemetry and an antenna allowing an operator to control all aspects of the drone from a remote position.

12 Claims, 5 Drawing Sheets

(56) References Cited

U.S. PATENT DOCUMENTS

| | | | |
|---|---|---|---|
| 9,957,045 B1* | 5/2018 | Daly | B64U 50/19 |
| 9,969,495 B2 | 5/2018 | Gil | |
| 10,035,596 B2 | 7/2018 | Phan et al. | |
| 11,957,085 B2* | 4/2024 | Guzmán | A01G 3/088 |
| 2017/0231164 A1* | 8/2017 | Sinyard | B25G 1/04 |
| | | | 30/122 |
| 2021/0031917 A1* | 2/2021 | Volpi | B64C 39/024 |
| 2022/0174932 A1* | 6/2022 | Ravanat | A01G 3/088 |

* cited by examiner

DRONE SAW

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/387,980, entitled "DRONE SAW", filed Dec. 19, 2022. The contents of the above referenced application is incorporated herein by reference in its entirety.

FIELD OF THE INVENTION

This invention is directed to the field of drones and in particular to a remotely controlled unmanned aerial vehicle that is capable of cutting or trimming trees using a chainsaw attached to the vehicle.

BACKGROUND OF THE INVENTION

Trimming tree branches is a dangerous occupation. Even with the latest technologies directed to safety guards, the potential of injury is undeniable. Since trees in need of trimming are always tall in stature, individuals assigned to the task must use extension poles and/or ladders to reach areas in need of trimming. For larger limbs, a chainsaw is typically used. Climbing a ladder alone can be dangerous and when used in combination with a chainsaw the individual will likely be working without holding on to the ladder. Falling off a ladder is a known risk and if an individual is standing on a ladder while operating a chainsaw, such a fall can be catastrophic. Placing a chainsaw on an extension pole and operating the combination from a ladder further complicates an already dangerous working condition. The weight of the chainsaw at the end of a pole can be difficult to control due to an extended cantilever effect. In addition, if the tree is near power lines should the operator of the pole mounted chainsaw contact the power lines he may be electrocuted.

Drones are presently being used with photography, inspections, and visual surveillance. From law-enforcement, to search and rescue, the full potential has not even begun to be utilized.

These are a few of the expanding applications of drones currently being used. For instance, U.S. Pat. No. 9,915,946 is directed to rooftop inspections with a drone. U.S. Pat. No. 9,969,495 is directed to drones and package delivery system. U.S. Pat. No. 9,852,644 is directed to drones capable of crop dusting. U.S. Pat. No. 9,829,266 is directed to a gun mounted on a drone recoil system. U.S. Pat. No. 9,764,839 is directed to a drone that can carry a tire water hose to fight fires.

U.S. Pat. No. 7,546,187 discloses a method for navigating a drone having an on-board digital camera. U.S. Pat. No. 7,460,148 discloses a near real time video system for dissemination of video data from surveillance systems. U.S. Pat. No. 7,130,741 discloses a remote control with a user's selection of a GUI map pixel that represents a waypoint for UAV navigation. U.S. Pat. No. 8,869,671 discloses a spring-driven linkage for deploying one or more kicker feet.

U.S. Pat. No. 9,957,045 discloses a stackable drone for carrying a larger payload. U.S. Pat. No. 9,314,922 discloses a remotely operated manipulator. U.S. Pat. No. 9,908,618 discloses an adjustable weight distribution for a drone. U.S. Pat. No. 10,035,596 discloses a drone with a micro engine configured to generate AC power.

U.S. Pat. Nos. 9,844,892 and 9,855,671 disclose a battery operated chain saw. U.S. Pat. No. 9,357,712 discloses a pole attached power tool. U.S. Pat. No. 5,884,403 discloses a powered tree limb trimming device.

What is needed is an improved device or method for trimming tree branches. The device would keep the operator safe from a loss of balance and provide remote access to difficult locations. Ideally the operator can stand a distance from the trimming operation where the operator would be clear of falling debris. Since the operator would be firmly on the ground, or a fixed base location, harmful injuries will be less likely to happen.

SUMMARY OF THE INVENTION

Disclosed is an improved device and method for trimming tree branches. The device is a drone having multiple motors/propellers in either a Quad, Octo, or Sexdecca copter. The drone includes a protective cage, frame, and adjustable arm having a chainsaw mounted thereto. Batteries used in operation can be moved to operate as a counter balancing weight if needed. While the drone and chainsaw are preferably electric but could also be powered by a hybrid gas/generator combination for longer flight.

In the preferred embodiment the drone is an octocopter with a protective screen. The drone has a battery power pack with an adjustable forward/aft to compensate the center of gravity. An articulating arm is mounted to the drone with a battery powered chainsaw positioned along the end of the articulating arm. The drone includes a remote control receiver, telemetry and an antenna allowing an operator to control all aspects of the drone from a remote position. This allows the operator to position himself/herself at a location where the top of the tree can be viewed at an acceptable angle. In addition, should the operation be near critical elements, such as bee hive, large bird nest, or power lines the remote positioning of the operator in respect to the cutting area provides unprecedented safety.

The device will keep the operator safe from a loss of balance and provide remote access to difficult locations. Ideally the operator can stand a distance from the trimming operation where the operator would be clear of falling debris. Since the operator would be firmly on the ground, or a fixed base location, harmful injuries will be less likely to happen.

An objective of the instant invention is to provide a landscaping drone capable of safely trimming tree branches.

Still another objective of the invention is to provide a landscaping drone that can trim branches close to power lines without subjecting the individual workers to possible electrocution.

Yet another objective of the invention is to provide a landscaping drone that allows trimming of trees and bushes without the need for a ladder.

Another objective of the invention is to provide a landscaping drone having a cutting guard that is movable only when in contact with a branch to be trimmed.

Yet still another objective of the invention is to provide a landscaping drone that operates a chainsaw for efficiently removing unwanted branches.

An objective of the invention is to provide a device and method that allows an operator to be able to cut, trim trees and bushes, from simple jobs, disaster relief: where the operator or "cutter" is in close proximity but firmly on the ground or at a fixed base clear from danger.

Other objectives and further advantages and benefits associated with this invention will be apparent to those skilled in the art from the description, examples and claims which follow.

DETAILED DESCRIPTION OF THE PREFERRED EMBODIMENT

Figure 1:
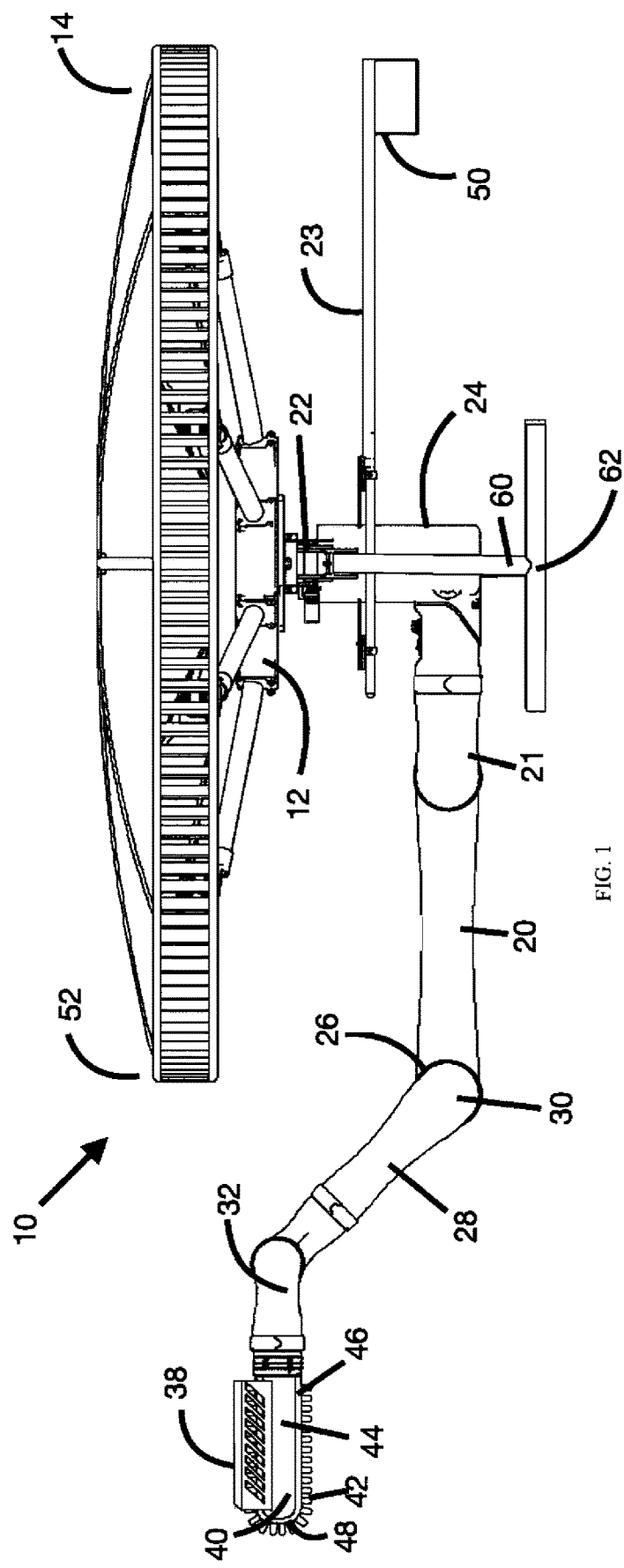
FIG. 1 is a side view of the drone saw.
Figure 2:
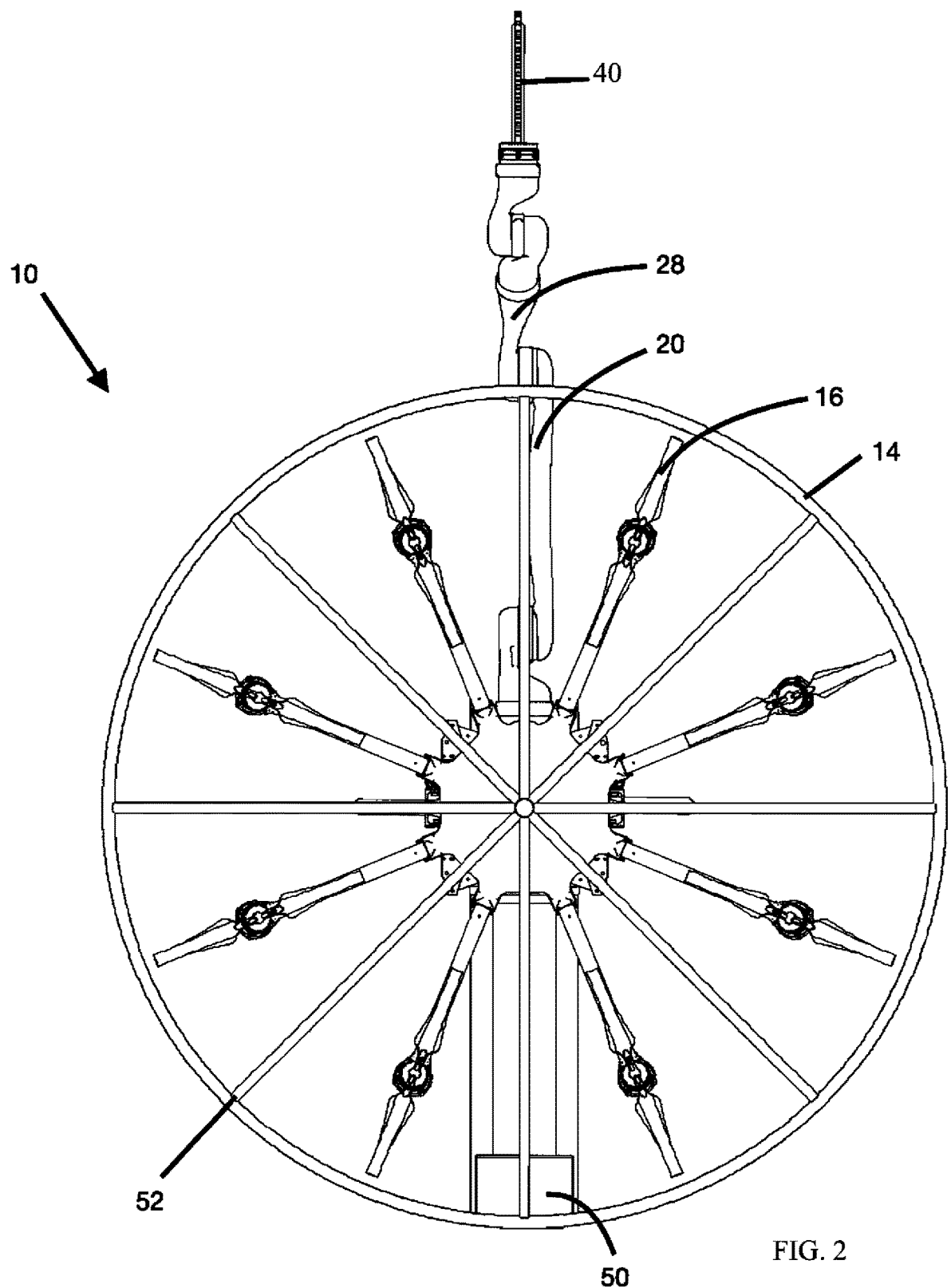
FIG. 2 is a top view thereof.
Figure 3:
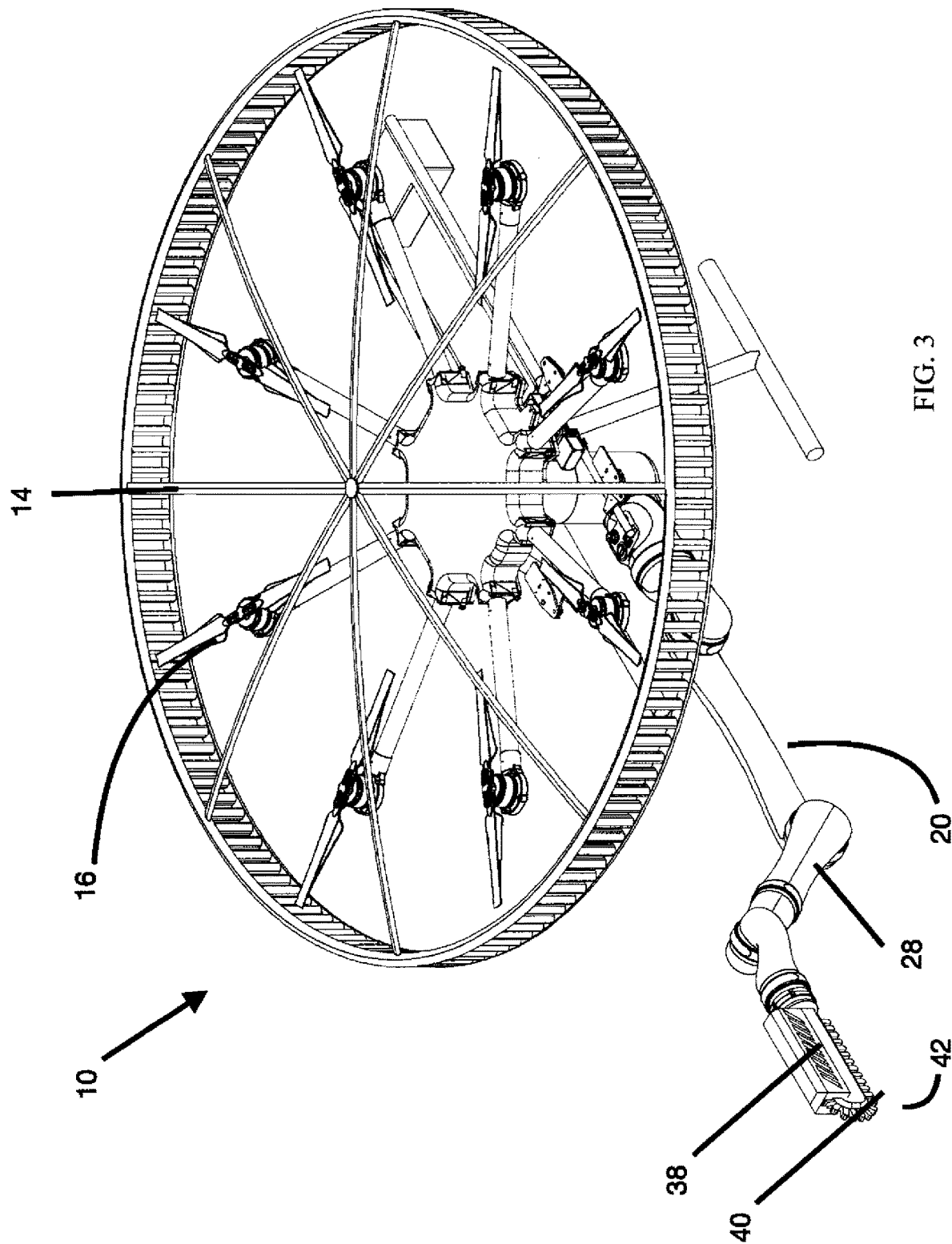
FIG. 3 is a perspective view thereof.
Figure 4:
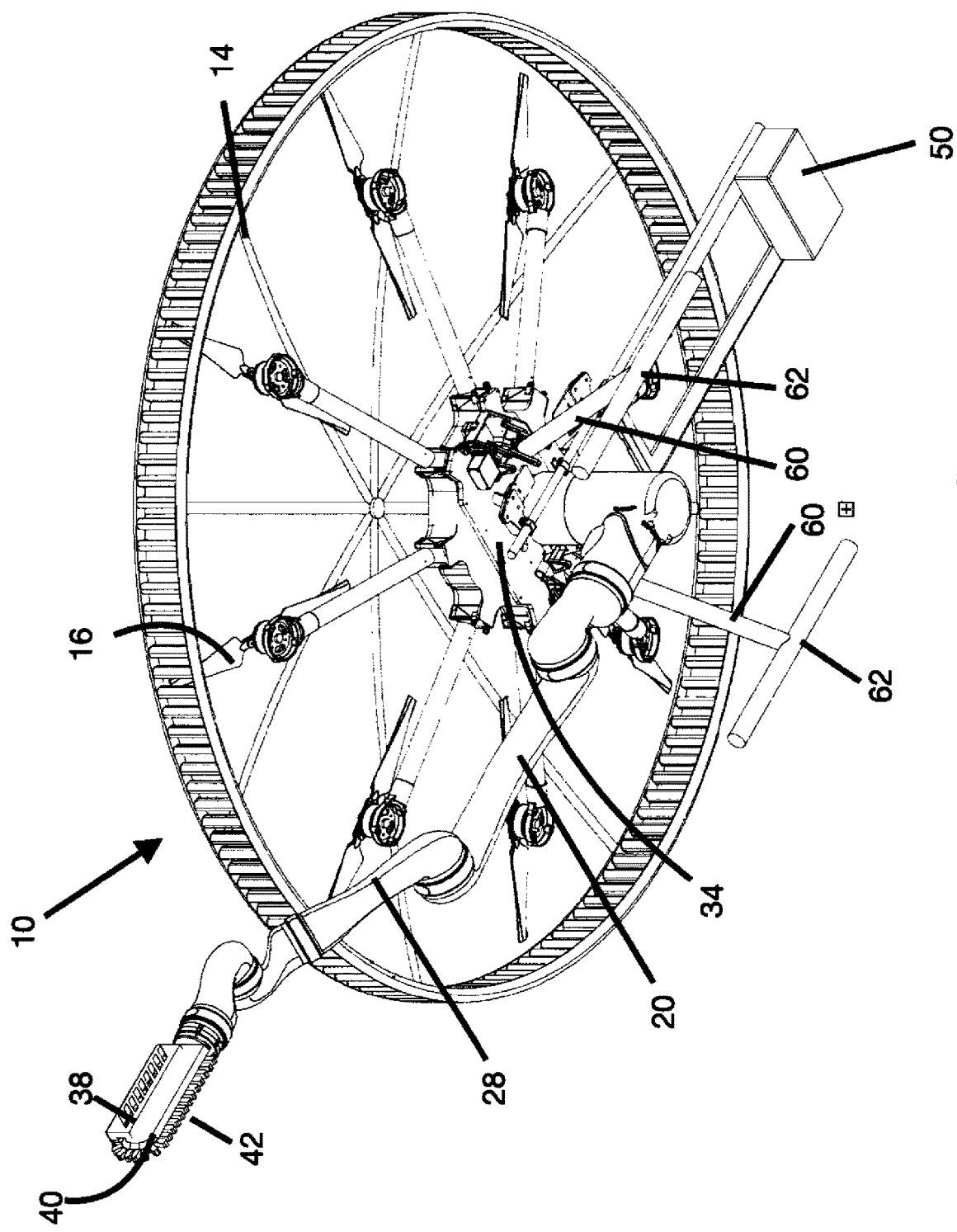
FIG. 4 is an underside perspective view thereof.
Figure 5:
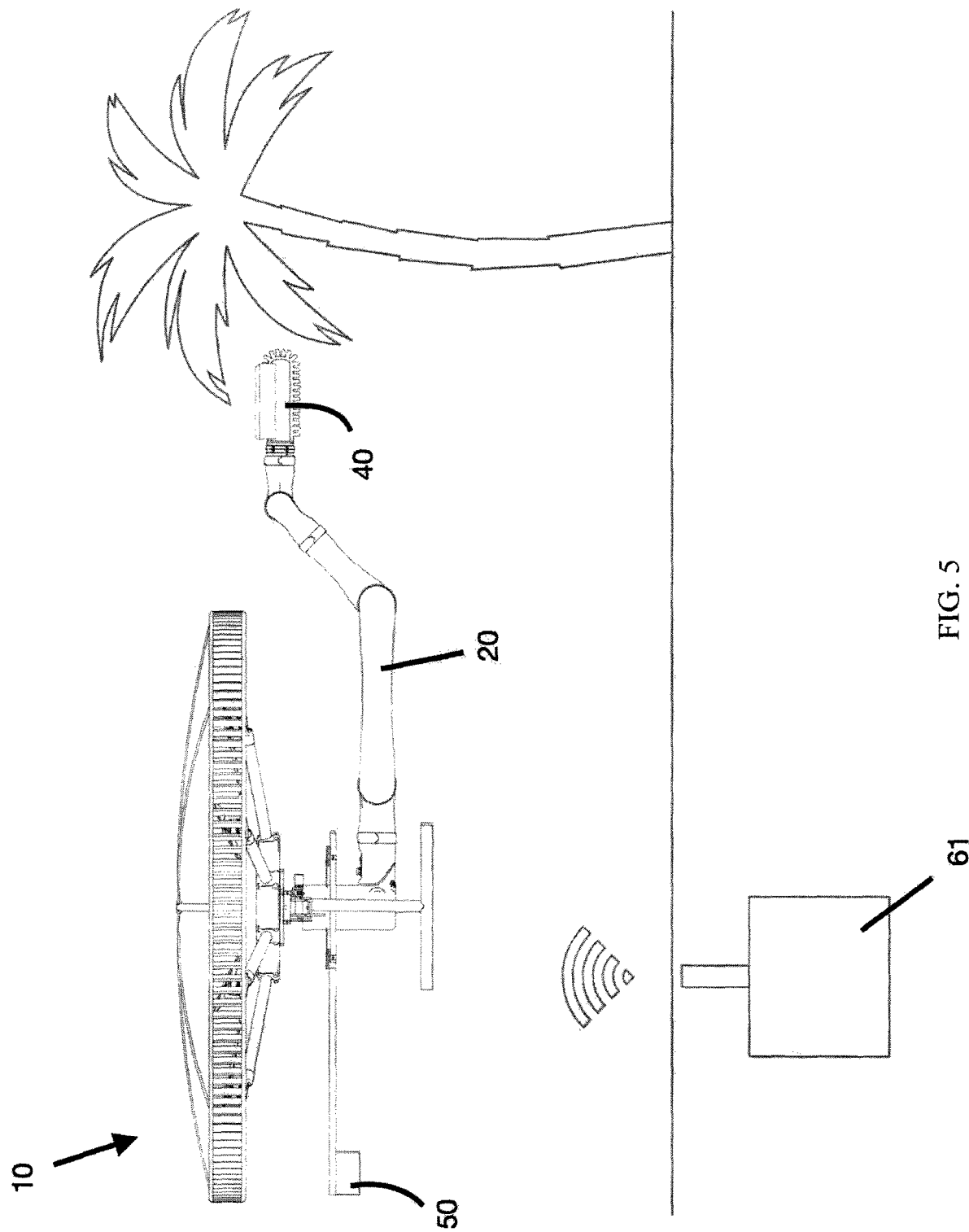
FIG. 5 is a pictorial view of the drone saw.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring now to the Figures, set forth is a drone saw 10 comprising a base 12 which, in the preferred embodiment, is an octocopter with a protective frame 14. The protective frame 14 is positioned so that tree limbs, leaves and the like will not impact the impellers 16 used to maintain the drone in flight. The drone 10 includes a first articulating arm 20 having a pivoting rotational coupling 22 along a proximal end 24 with the length of the arm 20 extending to a distal end 26. A second arm 28 is also defined by a proximal end 30 and a distal end 32. The first arm 20 is pivotedly coupled to the second arm 28 a fixed distance below a lower surface 34 of the base 12. Movement of the second arm 28 allows for the positioning of the distal end 32 in a location that operator can easily detect.

A saw mechanism 40 is coupled to the distal end 32 of the second arm 28 and, in the preferred embodiment, is comprised of an electrically driven chainsaw formed from a chain saw cutting chain 42 that spins around a chain base 44. The distal end 32 includes an electric motor so as to cause rotation of the chain 42, allowing operation of in the normal and conventional manner. A guard 38 encompasses the chain 42 and is movable along a lower edge 46 of the chain base 44 to allow cutting only along one edge so as to provide protection for operators when the drone is grounded. In this manner, the upper edge 48 of the chain base 44 is shielded which also can be use to prevent engaging limbs on multiple chain base edges. For instance, when the cutting chain 42 is positioned into a heavily foliated tree only one edge of the cutting chain would be engaged.

A battery power pack 50 is slidably positioned along a slide table 23 coupled to the lower surface 22 of the base 12, and is movable between a forward position along the proximal end 24 of the first member 21 and an aft position along the outer edge 52 of the frame 12. The battery power pack 50 is adjustable between the forward and aft position so as to provide compensation for the center of gravity when the repositioning of the chainsaw 40 occurs. A leveling mechanism is used for automatically moving the battery pack to maintain an even load on the propellers 16 used for lift.

The frame 12 includes retractable landing gear 60 having feet 62 that extend vertically for landing and storage, and fold outwardly against the screen fixed in place allowing the screen 14 to wrap be placed beneath the propeller blades 16 to prevent debris from impacting the bladed 16. For instance, when the drone is operated in heavy foliage, leaves or small tree limbs could impede the operation of the drone should they impact the propeller blades, wherein the screen prevents direct contact.

In an alternative embodiment, the base 12 may be stacked upon a second drone member, not shown, effectively doubling the capacity of the drone 10. The drone 10, as depicted, includes the necessary receiver, antenna, and appropriate telemetry so as to interface with a remote control transmitter 61. In addition, commercial operation of the drone saw requiring longer extended runs is possible by use of a micro engine, such as that disclosed in U.S. Pat. No. 10,035,596, so as to generate power for recharging the battery and operating of the saw. A micro engine is simply a miniaturized internal combustion engine coupled to an appropriate fuel tank.

The drone is preferably made out of lightweight carbon fiber, or a structurally reinforced plastic, so as to minimize weight. The propeller blades 16 are mounted within the frame 12 wherein the screening 14 protects the propeller operation along the upper and lower surfaces of the frame 12. It should be noted that chainsaw operation generates a tremendous amount of small debris, and the preferred operation is for the chain 42 to operate in a direction that prevents jamming while causing the debris to be projected away from the drone frame 12 to help maintain the screens 14 free from debris. The remote control transmitter 61 is designed to operate both the speed of chain rotation, direction, as well as angular articulation of the second arm 28, and rotational position of the first arm 20. In the preferred embodiment, the chainsaw base 44 operates at a position 180° from the battery pack 50 so as to allow ease of battery pack movement to operate as a counterweight. In this embodiment, the first arm 21 can be maintained in a stationary position and the use of a rotational drive to rotate the first arm 20 can be avoided.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An unmanned aerial vehicle (UAV) for trimming tree branches, said UAV comprising:
   a base supporting a propulsion system for generating thrust through a plurality of flight impellers secured thereto to enable controlled flight;
   a protective frame coupled to said base extending outwardly that provides protective enclosures for said impellers;
   a first articulating arm secured to said base having pivoting rotational coupling along a proximal end with the length of said first articulating arm extending to a distal end and a second articulating arm having a proximal end with the length of said second articulating arm extending to a distal end, wherein said first articulating arm is pivotally coupled to said second articulating arm below a lower surface of said base;
   a saw mechanism coupled to said distal end of said second articulating arm having a cutting chain that spins around a chain base;
   a control system including a set of processors and actuators configured to receive and process input data and control the flight parameters of the UAV;
   a power source for providing electrical power to the UAV components, said power source including a battery pack slidably positioned along a slide table coupled to said lower surface of said base and movable between a forward position along said proximal end of said first articulating arm and an aft position along an outer edge of said frame; and
   a micro engine coupled to a fuel tank to generate power for recharging said battery power pack and to operate said saw.

2. The UAV for trimming tree branches according to claim 1, wherein said protective frame is coupled to said base and extends outwardly therefrom provides a protective enclosure for said lower surface of said base.

3. The UAV for trimming tree branches according to claim 1, wherein said distal end of said second articulating arm includes an electric motor for rotation of said chain.

4. The UAV for trimming tree branches according to claim 1, wherein said battery power pack is adjustable between the forward and aft position to provide compensation for the center of gravity when the repositioning of said chainsaw occurs.

5. The UAV for trimming tree branches according to claim 1, includes a retractable landing gear having feet that extend vertically for landing and storage.

6. The UAV for trimming tree branches according to claim 5, wherein said feet are foldable against said frame.

7. The UAV for trimming tree branches according to claim 1, wherein said base may be stacked upon a second drone member.

8. The UAV for trimming tree branches according to claim 1, wherein said control system includes telemetry to interface with a remote transmitter.

9. The UAV for trimming tree branches according to claim 8, wherein said remote control transmitter operates the speed of the chain rotation, direction, as well as angular articulation of said second articulating arm, and the rotational position of said first articulating arm.

10. The UAV for trimming tree branches according to claim 1, wherein said base is composed of lightweight carbon fiber.

11. The UAV for trimming tree branches according to claim 1, wherein said chain base operates at a position 180° from said battery power pack to allow ease of battery power pack movement to operate as a counterweight.

12. The UAV for trimming tree branches according to claim 1, including a guard encompassing said chain along an upper edge of said chain base, wherein said guard allows cutting only along one edge and provides shielding from engaging limbs on multiple chain base edges.

* * * * *